United States Patent [19]
Malamud et al.

[11] Patent Number: 5,825,357
[45] Date of Patent: Oct. 20, 1998

[54] CONTINUOUSLY ACCESSIBLE COMPUTER SYSTEM INTERFACE

[75] Inventors: Mark A. Malamud; Renee Marceau; Joyce A. Grauman, all of Seattle; Royce A. Levien, Bellevue, all of Wash.; Daniel P. Oran, Old Brookville, N.Y.; David A. Bolnick; David A. Barnes, Jr., both of Seattle, Wash.; Russell Scott Johnson, Bothell, Wash.

[73] Assignee: Microsoft Corporation, Redmond, Wash.

[21] Appl. No.: 667,362

[22] Filed: Jun. 21, 1996

Related U.S. Application Data

[63] Continuation of Ser. No. 166,566, Dec. 13, 1993, abandoned.

[51] Int. Cl.$^6$ ............................................. G06F 15/00
[52] U.S. Cl. .................... 345/340; 345/334; 345/335; 345/351; 345/353; 345/354
[58] Field of Search .................... 345/334, 335, 345/339, 340, 343, 346, 348, 349, 350, 351, 352, 353, 354, 357, 358

[56] References Cited

U.S. PATENT DOCUMENTS

| | | | |
|---|---|---|---|
| 5,146,556 | 9/1992 | Hullot et al. | 345/348 |
| 5,367,624 | 11/1994 | Cooper | 345/357 |
| 5,398,510 | 3/1995 | Tchao et al. | 345/341 |
| 5,412,776 | 5/1995 | Bloomfield et al. | 345/346 |
| 5,414,806 | 5/1995 | Richards | 345/435 |
| 5,487,143 | 1/1996 | Southgate | 345/342 |

FOREIGN PATENT DOCUMENTS

| | | |
|---|---|---|
| 0 483 777 A2 | 5/1992 | European Pat. Off. . |
| 0 483 777 A3 | 5/1992 | European Pat. Off. . |
| 2 693 810 | 1/1994 | France . |
| 3618256A1 | 12/1987 | Germany . |
| WO 94/29793 | 12/1994 | WIPO . |

OTHER PUBLICATIONS

Anonymous, "Graphical Window List System," *Research Disclosure* 348:270 (entire document), Ensworth GB, Apr. 1993.

"From Little Acorns . . .", Desktop Publishing Today, Dec. 1989/Jan. 1990, pp. 20, 22, 24.

"User's Guide to OS/2 Warp," International Business Machines Corporation, 1994 Chapter 3, pp. 38–43.

"What's New in System 7 Pro—Installation and new capabilities," Apple Computer, Inc., 1993, pp. 16–19.

User's Guide—Microsoft® Publisher, Desktop Publishing Program, Version 2.0, Windows™ Series, Microsoft Corporation, 1993, pp. 44–45.

Fernandez, Charles V. "A Graphical User Interface for a Multimedia Environment," Hewlett–Packard Journal Apr. 1994, pp. 20–22.

"Norton Desktop™ for Windows User's Guide—The Norton Desktop," Symantec Corporation, 1993, pp. 4–to 4–9; 5–1 to 5–7; 6–1 to 6–11.

"*For Windows Dashboard*™—The Fastest Way to Work in Windows," Hewlett Packard Owner's Handbook, 1993, pp. 2–89.

(List continued on next page.)

*Primary Examiner*—Ba Huynh
*Attorney, Agent, or Firm*—Leydig, Voit & Mayer, Ltd.

[57] ABSTRACT

A system and method are described for presenting a continuously accessible computer system tool interface. The interface of the present invention comprises a separated applications section and system tray section. The applications section provides a portion of the graphic user interface for running applications programs. The tray section provides an alternative region of the graphic user interface for objects to surface their key features while occupying only a small portion of the display space. The tray section is supported by a Tray Object which provides a frame work for tray aware applications to dock.

50 Claims, 7 Drawing Sheets

OTHER PUBLICATIONS

Article entitled "DeScribe, Lotus Tackle 32–Bit WP" by P. Rooney, *PC Week*, Nov. 9, 1992, p. 26.

Article entitled "HP Squeezes More Tools Into Slim Dashboard 2.0", by B. Simon, *PC Magazine*, Sep. 28, 1993, p. 50.

Article entitled "Dashboard—Utilities At Your Fingertips", by D. Methvin, *Windows Magazine*, Sep. 1, 1993, p. 96.

Article entitled "New Version of Dashboard From HP Has More Than 25 New Features and Enhancements; Dashboard Speeds past Competitors as Sales Exceed 300,000 Units", *Business Wire*, Aug. 9, 1993.

Article entitled "Sick of Clunky Windows? HP's New Dashboard to the Rescue", by D. Haskin, *PC–Computing*, Sep. 1993, v6 n9, p. 48(1).

Article entitled "HP's Dashboard Eass Windows Use", by Q.R. Safi, *PC Week*, Aug. 9, 1993, v10, n31, p. 81(2).

Article entitled "Dashboard 1.0 (HP)", by S. Gilliand, *PC Sources*, May 1993 v4 n5 p. 263(1).

Article entitled "Launching Programs", by B. Simon, *PC Communting*, Apr. 1993 v6 n4 p. 119(3).

Article entitled "Dashboard Puts The User in the Driver's Seat", by T. Pompili, *Windows Sources*, Feb. 1993 v1 n1 p. 248(1).

Article entitled "Dashboard For Windows", by R. Ayre, *PC Magazine*, Jan. 12, 1993 v12 n1 p. 120(1).

Article entitled "HP's Dashboard Aids Users in the Fast Lane", by K. Hart, *Computer Shopper*, Jan. 1993 v13 n1 p. 588(1).

Article entitled "Why Buy The Car When You Can Get The Dashboard For $99", by C. Morgan, *Government Computer News*, Dec. 21, 1992 v11 n26 p. 46(1).

Article entitled "Dashboard Adds Useful Goodies to Windows", by T. Bigley, *InfoWorld*, Dec. 7, 1992 v14 n49 p. 136(1).

Article entitled "HP's Dashboard: Another Way To Drive Windows", by B. Simon , *PC Magazine*, Nov. 10, 1992 v11 n19 p. 53(1).

Article entitled "Dashboard Keeps Windows On Board", by E. Grevstad, *Computer Shopper*, Nov. 1992 v12 n11 p. 694(1).

Article entitled "Dashboard For Windows", by L. Radosevich, *Lotus*, Nov. 1992 v8 n11 p. 72(1).

Article entitled "Dash It All!", by R. Beattie, *PC User*, Oct. 21, 1992 n196 p. 53(1).

Article entitled "HP's Push–Botton Dashboard For Windows", by K.M. Sheldon, *Byte*, Oct. 1992 v17 n10 p. 64(1).

Article entitled "Paradise By The Dashboard Lights", by M.B. Kehoe, *HP Professional*, Oct. 1992 v6 n10 p. 38(1).

Article entitled "Drive Windows By The Light Of The Dashboard", *PC World*, Oct. 1992 v10 n10 p. 52(1).

Article entitled "HP's Splashy Dashboard", by S. Finnie, *PC–Computing*, Oct. 1992 v5 n10 p. 90(1).

Article entitled "The Cabbage Patch", by B. Simon, *PC Magazine*, Sep. 29, 1992, v11 n16 p. 177(1).

Article entitled "Dashboard Tunes Up Handling of Windowed Applications", by E. Scannell, *InfoWorld*, Sep. 14, 1992, v14 n37, p. 24(1).

Article entitled "HP Delivers $99 'Dashboard' Windows Utility", by H. Clancy, *Computer Reseller News*, Sep. 7, 1992, n490, p. 57(1).

Article entitled "Windows: HP Ships Dashboard For Windows; Utility Gives Users A Faster Way To Work In Windows", *EDGE: Work–Group Computing Report*, Sep. 7, 1992, v3 n120 p. 4(1).

Article entitled "New For Windows: HP's Dashboard—Updated Report", by L. Rohbrough, *Newsbytes*, Sep. 4, 1992.

Article entitled "New For Windows: HP's Dashboard—Race Car Metaphor", by L. Rohrbough, *Newsbytes*, Sep. 3, 1992.

CONTINUOUSLY ACCESSIBLE COMPUTER SYSTEM INTERFACE

CROSS-REFERENCE TO RELATED APPLICATION

This application is a file wrapper continuation application under 37 C.F.R. § 1.62 of U.S. patent application Ser. No. 08/166,566, filed Dec. 13, 1993, now abandoned.

FIELD OF THE INVENTION

This invention relates to the field of user interfaces for computer systems, and more particularly to graphical user interfaces wherein a user selects from a collection of graphical representations displayed upon a video screen corresponding to actual computer resources.

BACKGROUND OF THE INVENTION

The United States has experienced an extraordinary expansion in the ownership and utilization of computers. Computers, once considered primarily the tools of scientists, can now be found in a substantial portion of the homes and businesses across the country. Though partial credit for the unprecedented growth in the utilization of computers is attributable to lower costs associated with manufacturing computers and related peripheral devices which has made such equipment affordable to a much larger segment of the public, the credit is equally, if not more, attributable to the enhanced versatility, ease in learning to use, and ease of using of computers which is provided by the operating systems and applications software running on the now affordable computers.

It is therefore a very important objective when designing an operating system, and more particularly a user interface for a computer system, to provide a high degree of user friendliness, which incorporates ease of learning and ease in using the computer system, as well as a high degree of versatility. Users appreciate a system which enables them to accomplish their computer related tasks with the least amount of obstacles and delays. A considerable number of the computer users/operators today base their like or dislike of a computer system upon the user interface and the user interface's time and effort saving features.

The Windows operating system and its series of menus and buttons has simplified the use of the computer system. The Windows operating system is unquestionably easier to learn than earlier operating systems. Even more importantly the Windows operating system enables a user to access a great number of computer resources from any given screen by selecting ones of the many menu items and control buttons.

In prior art operating systems, accessing files and computer resources requires traversing the directory tree structure. When a user wishes to gain access a particular file, or other computer resource, the user traces through the directory structure and opens up various directories and subdirectories before reaching the particular file or computer resource.

Though traversing the tree structure of a relatively non-complex file system in order to gain access to a desired resource does not present a very formidable task in itself, this task can be both time consuming and challenge the patience of a user when the directory tree must be repeatedly traversed in order to access resources located in different positions of the directory structure. This problem is multiplied when the separate resources are stored in divergent locations in a complex file directory structure. It is therefore desirable to operate a system wherein files and other computer resources are quickly and easily accessed, even when the files and resources are located in remote and divergent locations in the directory structure of the computer system data storage devices.

Another challenge facing computer system developers is to provide a flexible platform for accessing and executing computer resources in order to accommodate the unique needs of various users. Known user interfaces, referred to as command accelerators, provide a specific, pre-programmed set of direct access commands. However, these command accelerators lack flexibility. The programs which support these direct access commands cannot be altered or customized to meet the specific needs for a particular user or application. The prior art interfaces suffered from the inflexibility of a static set of commands. As a result, the prior art direct access command interfaces are either over-inclusive and provide unnecessarily large collections of computer resources, or they are too narrow and do not provide the desired direct access to a sufficient number of computer resources.

Padawer et al. U.S. Pat. No. 5,220,675, assigned to Microsoft Corporation of Redmond, Washington, discloses a computer system wherein additional menu items associated with computer programs are inserted on a menu and the programs represented by the menu items are executed when the menu items are selected by the user. A menu, however, is coupled to a specific application running on the computer system and that menu is not displayed unless the specific application responsible for the generation of that menu is surfaced. Furthermore, the modifiable menu in the Padawer et al. '675 patent extends to display the set of applications during the selection process and the menu is retracted when a selection is not being made by the user. Thus, for reasons related to the nature of the uses of a menu, the known alterable menu is not a persistent user interface mechanism. In other words, the menu's persistence is limited by the persistence of the application program that created the menu.

SUMMARY OF THE INVENTION

It is therefore an object of the present invention to enhance the ease with which a user of a computer accesses a modifiable set of computer resources.

It is another object of the present invention to enable the user to easily alter the modifiable set of computer resources.

It is a further object of the present invention to provide a flexible direct access command interface which supports a wide variety of uses for the computer system.

It is another related object of the present invention to provide a persistent user interface tool that minimizes interference with the portion of the video interface allocated for displaying images associated with application programs.

It is yet another object of the present invention to enable the user to control the execution of an extensible set of concurrently running programs by means of a computer resource accessed via a persistently available system tool.

It will also be apparent from the description of the preferred embodiment of the invention described below that a number of other objects concerning the goals for development of superior user interfaces including enhanced user friendliness, extensibility, and versatility are achieved as well by the present invention.

The above and other objects are achieved by an improved computer system which includes a central processing unit (CPU) and associated electronic memory for storing programs executed by the CPU. The computer system also includes a video interface coupled to the CPU for facilitating user access to the computer resources provided by the computer system. The video interface comprises an applications section for displaying images corresponding to signals transmitted by the CPU in accordance with the execution of application programs by the CPU. The video interface of the improved computer system includes a tray section. The tray section is a persistent and extensible graphic user interface facility. The tray section of the user interface provides both visual and operational direct access to an extensible, user modifiable, set of computer resources associated with the tray section and displayed within the tray section in the form of a set of representations.

A user modifies the set of computer resources associated with the tray section by means of a display set modifier. The display set modifier enables the user to transfer a computer resource associated with the applications section of the user interface to the tray section. The display set modifier enables the user to modify the set of computer resources associated with the tray section by a mouse controlled drag and drop operation on a window represented upon the video display interface or any other known manners for transferring the location of a computer resource displayed upon a video interface.

After a computer resource becomes associated with the tray section, the appearance of the computer resource may be altered, however, the window remains directly accessible to the user by accessing the portion of the tray occupied by the computer resource. The direct accessibility of the computer resource is unaffected by computer resource's location in the system directory structure in relation to the computer system's present point of access in the directory hierarchy.

The computer system of the present invention provides a versatile, extensible, user friendly command platform for enabling a wide variety of users to define their own set of directly accessible computer resources. The behavior of computer resources associated with the tray section is defined by the computer resource. The set of directly accessible computer resources associated with the tray section is adaptable to each user's particular needs.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE DRAWINGS

Figure 1:
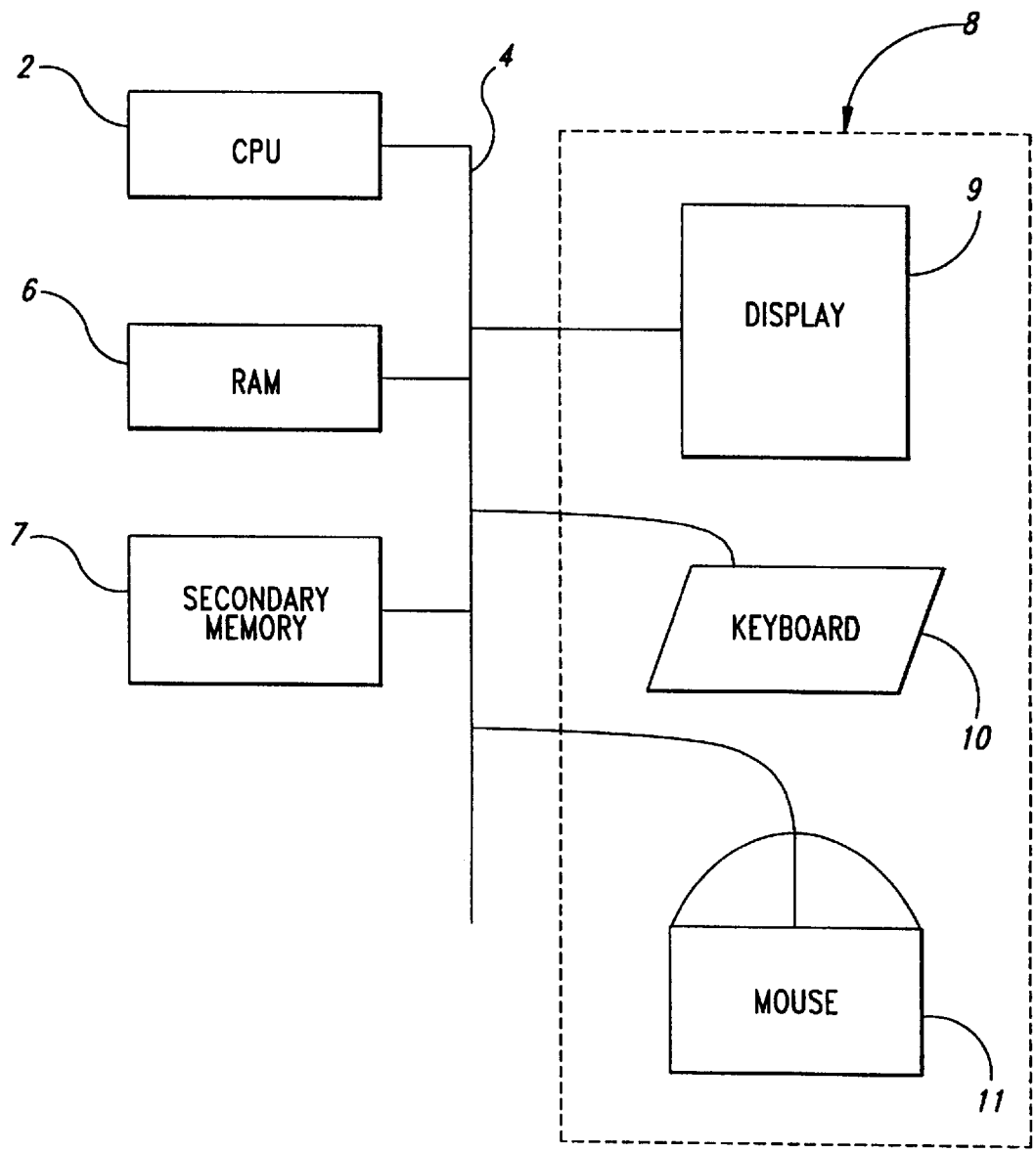
FIG. 1 is a schematic drawing of an exemplary computer system incorporating the present invention.

The computer system schematically illustrated in FIG. 1 comprises a central processing unit (CPU) 2 coupled by means of a bus 4 in a known manner to a random access memory 6. The CPU 2 is also coupled to a non-volatile secondary memory 7 for storing various system and applications routines and programs. The CPU 2 is coupled in known manner to a user interface 8 including a video display 9. The video display 9 may be any of a number of known display devices including, for example, monochrome and color cathode ray tubes and LCD displays. The user interface 8 also includes a keyboard 10 and mouse 11 to facilitate the submission of instructions to the CPU 2. Though not shown in FIG. 1, the computer system may also include a number of peripheral units as would be known to those skilled in the art. The computer system hardware depicted in FIG. 1 is intended merely to show a representative hardware configuration. It would of course be understood by one of ordinary skill in the art that the present invention encompasses other computer system hardware configurations and is not limited to the computer system hardware configuration described above.

Figure 2:
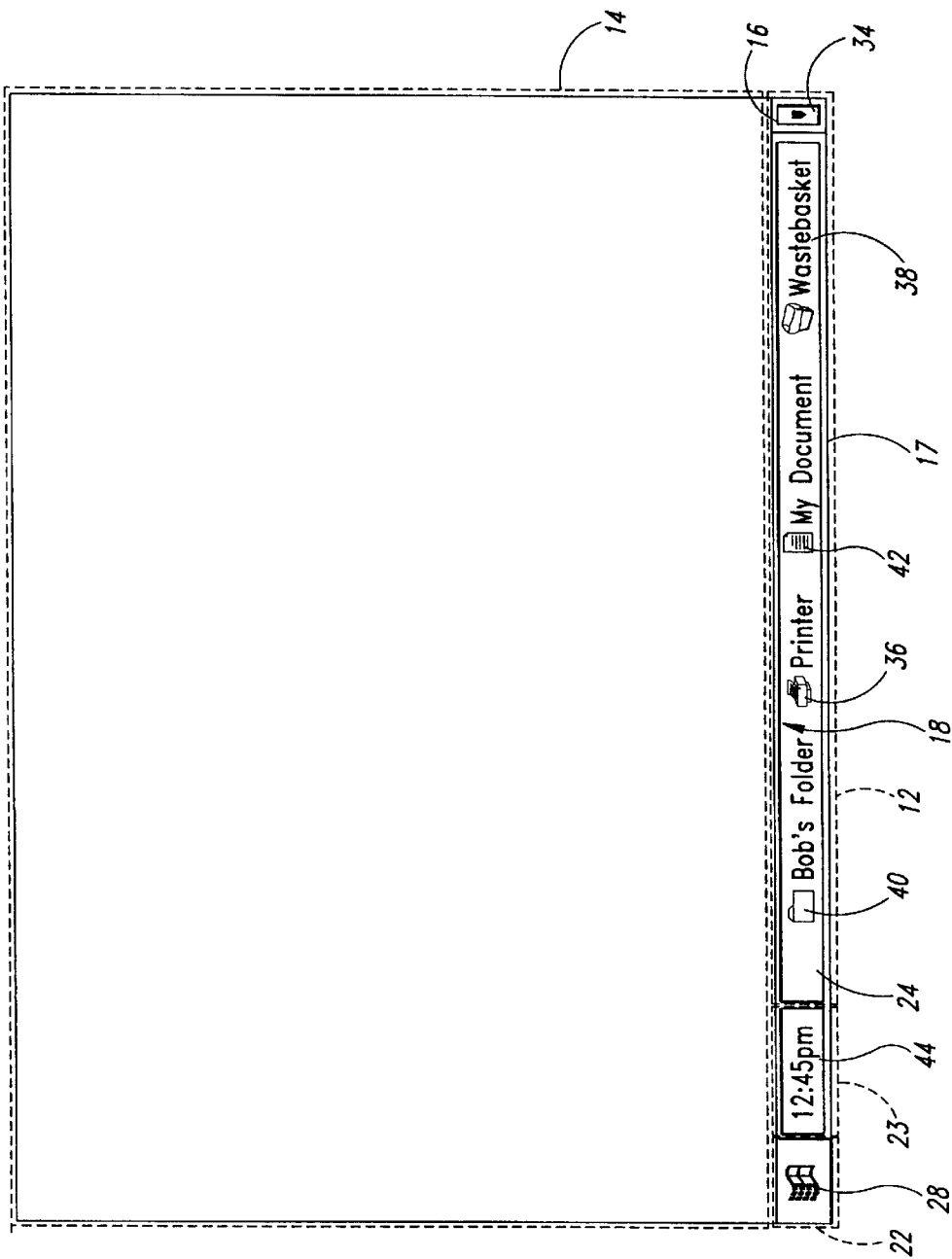
FIG. 2 is an illustrative depiction of the display for a computer system incorporating the present invention.

Turning to FIG. 2, a display screen of a computer system embodying the present invention includes two general sections, a tray section 12 and an applications section 14. The applications section 14 is the area in which application windows may appear. An application window may occupy the entire applications section 14 or a smaller portion of the entire applications section 14.

The tray section 12 is a portion of the display screen reserved for presenting a modifiable collection of representations corresponding to computer resources which include both objects and controls. The tray section 12 displays representations corresponding to directly accessible computer resources including objects and controls. Display mode controls associated with the tray section 12 enable a user to define how, where, and when the tray section 12 and computer resources associated with the tray are displayed.

Figure 3:
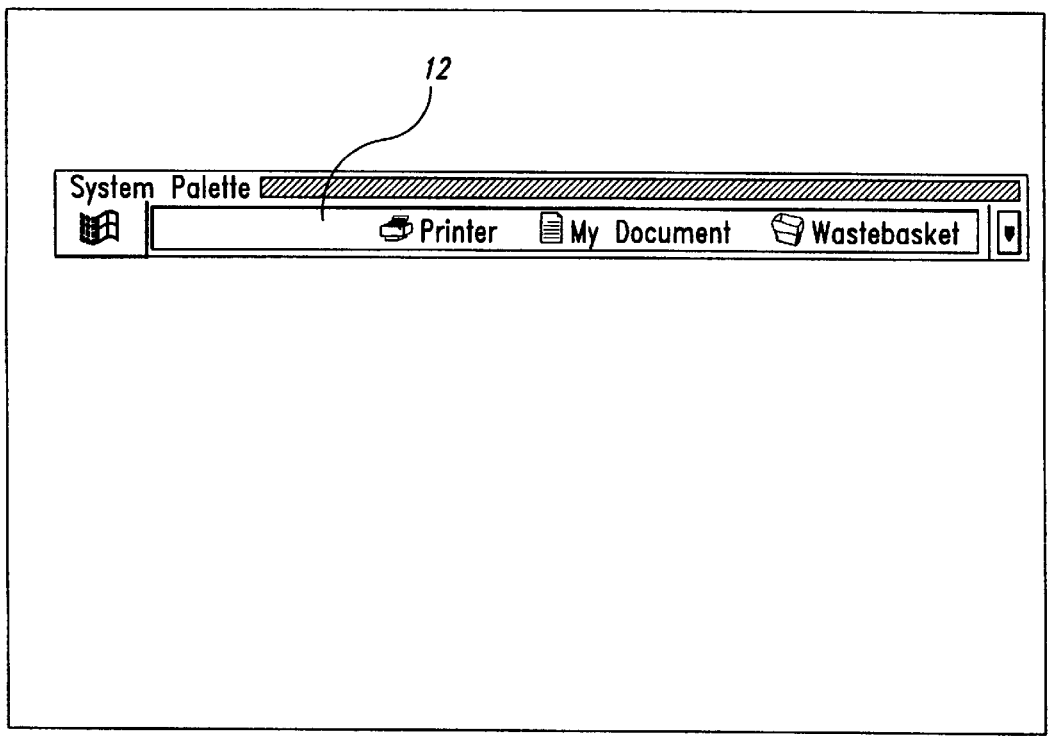
FIG. 3 is an illustrative depiction of the display for a computer system incorporating an alternative embodiment of the invention wherein the tray section of the screen comprises a palette.

The user may either attach the tray section 12 to any of the four sides of the display screen or display the tray section 12 as a palette as shown in FIG. 3. In the palette mode of display for the tray section 12, both the dimensions and position of the tray section 12 are modifiable by the user. In the palette version of the tray section 12 such as the one displayed in FIG. 3, the boundaries of the applications section 14 are the boundaries of the display screen, and the tray section 12 occupies a portion of the display screen within the external boundaries of the applications section 14.

FIG. 2 provides an illustrative depiction of a display screen wherein an edge 17 of the tray section 12 is attached to an edge of the display screen. The user defines the edge of the screen on which the tray section 12 will be displayed by selecting a position presented from a list of options provided to the user by a parameter selection interface such as a user activated menu or dialogue box or direct manipulation via the mouse. When attached to an edge of the display screen, the tray section 12 limits the maximum area taken up by a window presented in the applications section 14 and cannot be displaced by a window displayed in the applications section 14.

In the illustrative depiction of a display screen shown in FIG. 2, the tray section 12 defines a bottom border 16 of the applications section 14 and occupies less than 10 percent of the total area of the video screen. However, the percentage of the display screen occupied by the tray section 12 in FIG. 2 is merely illustrative. The tray section 12 may occupy a greater or lesser percentage of the video screen space depending upon various design considerations and/or the preferences of a user. In one embodiment of the present invention, the user re-sizes the tray section 12 in a direction perpendicular to an attached screen edge by moving a mouse controlled pointer to the inside edge 18 of the tray section 12 and then dragging the edge 18.

Figure 5:
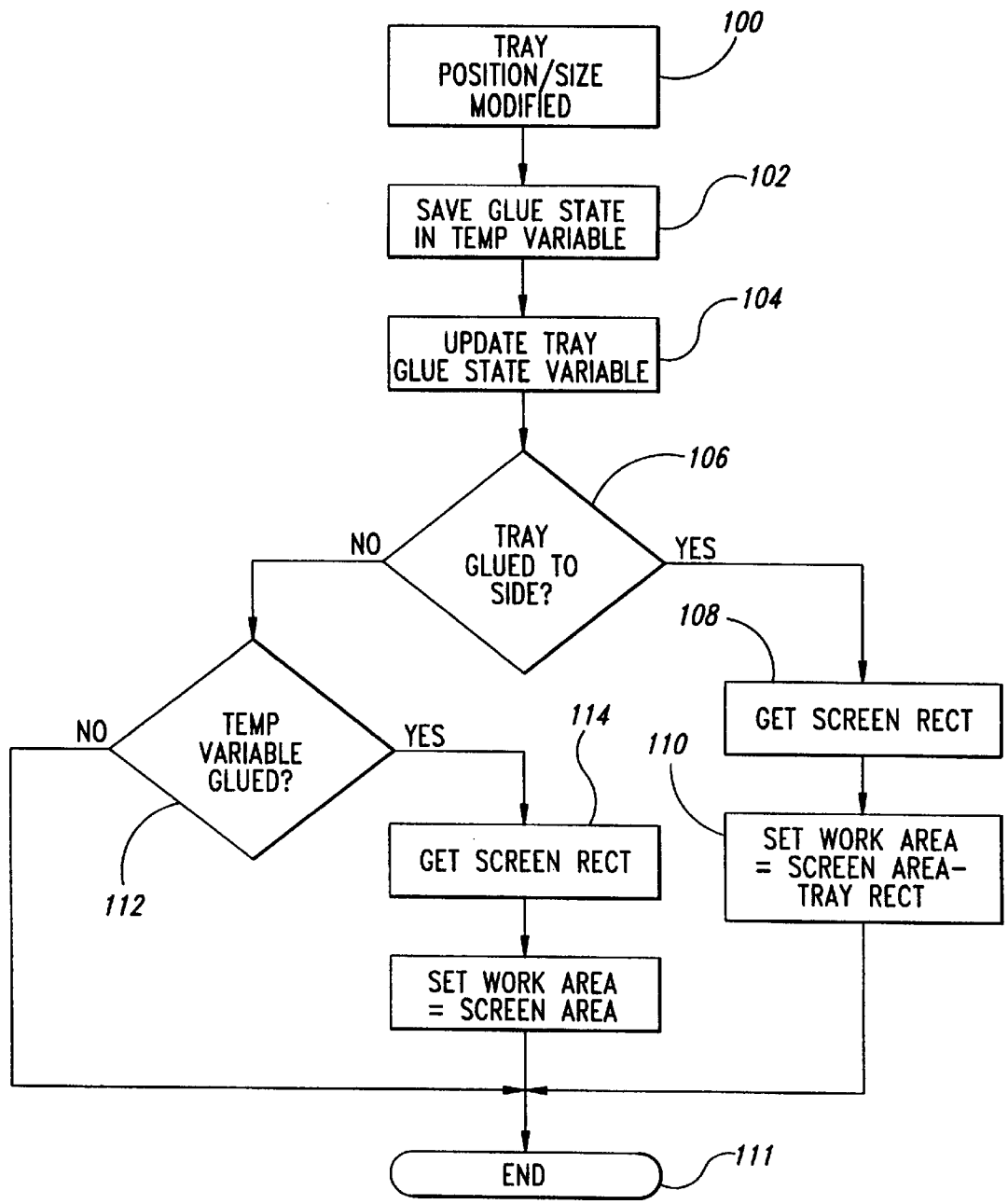
FIG. 5 is a flow diagram summarizing the steps for re-defining the boundaries of the applications section due to a change in the display state of the tray section.

Turning to FIG. 5, a flow diagram is provided that summarizes the steps executed by the computer system to re-define the boundaries of the applications section 14 when the user requests movement or re-sizing of the tray section 12. The computer system enters step 100 in response to a request by a user to modify the position and/or size of the tray section 12. Next, at step 102 the computer system saves the current position of the tray section 12 as a temporary variable. Next, at step 104, the computer system saves the requested new position of the tray section 12 and control passes to step 106.

At step 106, the computer system determines whether the requested new position of the tray section 12 is one of the edges of the display screen. If the new position of the tray section is at one of the edges of the screen, then control passes to step 108. At step 108, the computer system retrieves the dimensions of the screen area rectangle and control then passes to step 110. Next, at step 110, the computer system defines and stores in the memory the boundaries of the tray section 12 and the applications section 14 (based upon the new boundaries of the tray section 12). Control then passes to the end 111.

If, however, at step 106 the computer system determines that the user has requested the tray section 12 to be a palette view, then control passes to step 112. At step 112, the computer system determines whether the current position (stored at step 102) is a palette view. If the current position is a palette view, then control passes directly to the end 111 because there is no change in the boundaries of the applications section 14.

If, however, at step 112, the computer system determines that the current position of the tray section 12 is at one of the edges of the display screen, then control passes to step 114 wherein the computer system retrieves the dimensions of the screen area rectangle and control passes to step 116. At step 116, the computer system defines and stores in the memory the boundaries of the applications section 14 which are set equal to the boundaries of the display screen. Control then passes to the end 111.

In an embodiment of the present invention a mechanism is provided for hiding or minimizing the tray section 12 to allow the applications section 14 to occupy all or nearly all of the display screen. In one user specifiable display mode of the tray section 12, the user instructs the computer system to completely remove the tray section 12 from the display screen.

Figure 4:
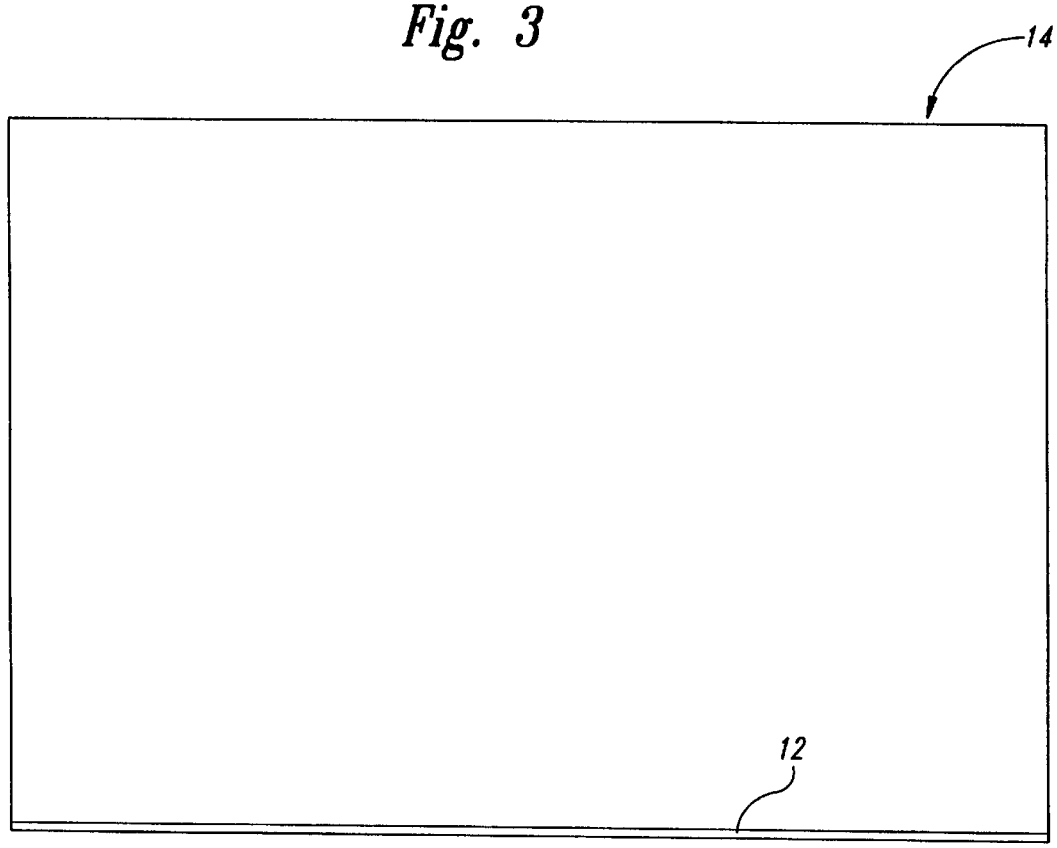
FIG. 4 is an illustrative depiction of the display when the tray section has been collapsed in order to enable a greater percentage of the total screen space of a video display interface to be occupied by the applications section.

An alternative display mode collapses the tray section 12 so that the tray section 12 occupies a very small portion of the display screen. Turning now to FIG. 4, an illustrative depiction is provided of a display screen after a user prompts the computer system to collapse the tray section 12 to a width of four pixels thereby enabling the applications section 14 to occupy substantially the entire screen. A user causes the tray section 12 to be displayed in the collapsible mode by selecting a "collapse" command from a menu provided by the graphical user interface. Thereafter, the computer system collapses the tray section 12 and re-defines the boundaries of the applications section 14 to occupy almost the entire screen as depicted in FIG. 4.

After the computer system collapses the tray section 12, the user accesses the computer resources of the tray section 12 by bringing a mouse controlled pointer (not shown) into the vicinity of the collapsed tray section 12. When the mouse controlled pointer is placed in the vicinity of the collapsed tray section 12, the extended tray section 12 (illustrated in FIG. 2) replaces the collapsed version (illustrated in FIG. 4) thus providing direct access to computer resources corresponding to the representations displayed in the tray section 12.

Returning to FIG. 2, the tray section 12 includes a command area 22, an extended command area 23 (present when an object embeds and thereby becomes a part of the tray section 12 which is visible whenever the tray section is displayed), and a panel area 24. The command area 22 is always visible when the tray section 12 is visible. The command area 22 of the tray section 12 enables a user to access system commands such as Log Off, Help, Find, Create, etc. by means of a known mouse controlled pointer. The panel area 24 comprises the portion of the tray section 12 in which the user drags and drops objects which recognize and have defined behavior when interacting with the tray section 12. The objects become associated with the tray section 12 of the graphic user interface by means of a docking procedure explained herein below. The extended command area 23 comprises a portion of the tray section 12 that displays embedded applications.

Continuing with the description of FIG. 2, the command area 22 displays a system icon 28. The system icon 28 provides persistent, direct access to a set of operating system commands. Selecting the system icon 28 causes the computer system to display a menu including a set of system commands. The user selects a system command from the menu by means of the mouse 11 or other suitable selection device such as a keyboard 10.

Though the command area 22 of the tray section 12 depicted in FIG. 2 contains only the system icon 28, other computer resources may be included in the command area 22. Further computer resources permanently embedded in the command area may include a searching utility and a help utility. Though three specific examples of computer resources which may reside in the command area have been provided, those of ordinary skill in the art will appreciate that other computer resources can be added to the command area 22.

Continuing with the description of FIG. 2, the panel area 24 of the video interface comprises a set of advanceable panels. In one embodiment of the present invention only one panel is displayed in the tray section 12 at any given point in time. When more than one panel exists for the tray section 12, the user advances through the panels displayed at the panel area 24 by moving a mouse controlled pointer over the panel button 34 and thereafter clicking a mouse button to advance the set of panels associated with the panel area 24 to a desired panel. The selection of a particular panel is alternatively accomplished by selecting the panel from a menu associated with the panel area 24. Though only one panel is visible at any given time, other embodiments of the present invention may provide for the simultaneous display of multiple panels in the tray section 12.

Continuing to reference FIG. 2, the panel area 24 is the portion of the tray section 12 utilized by a user to dock independent objects including: open electronic folders such as Bob's Folder 40, open word documents such as My Document 42, and an unlimited number of other types of applications and computer resources having the necessary information for instructing the computer system how to handle the docking of the application or computer resource and thereafter adding a display element to the tray section 12 corresponding to the docked object. The panel area 24 illustratively depicted in FIG. 2 also displays a printer icon 36 and a wastebasket 38 thus facilitating persistent, direct user access to those well known computer resources. Other computer resources suitable for the tray section 12 are described below.

Having described the display characteristics of the tray section 12, attention is now directed to the internal structure of the portion of the computer system supporting the tray section 12 and the relation of the tray section 12 and the objects associated with the tray section 12 to the rest of the computer system. The general structure of the "Tray Object" responsible for the display and behavior of the tray section 12 of the graphic user interface will be described in conjunction with FIGS. 6a, 6b and 6c. Thereafter, the steps for modification of the contents of the tray section 12 are described in conjunction with the flow diagrams provided in FIGS. 7 and 8.

The portion of the operating system responsible for the tray section 12 of the graphic user interface is a system container that manages, both visually and logically, objects that allow direct access to computer resources encapsulated within the objects. The tray section 12 includes visual display areas defined by the portion of the operating system responsible for the tray section 12 and also areas where independent objects which have become associated with the tray section 12 are displayed. A user, through the graphic user interface, manipulates where and when the independent objects are displayed in the tray section 12.

The collection of representations corresponding to the independent objects (which appear in a form defined by the objects) displayed within the tray section 12 comprise graphic user interface images which are the manifestation of, and result from, interaction between objects encapsulating computer resources which have become associated with the tray section 12 and a portion of the computer system which provides a framework for the displaying and accessing the computer resources when the objects encapsulating the computer resources become associated with the tray section 12. More specifically, the visual and logical behavior of the objects once they become associated with the tray section 12 is determined by properties specified by the objects which are then applied to the framework provided by the portion of the computer system which supports the tray section 12 of the graphic user interface.

Figure 6A:
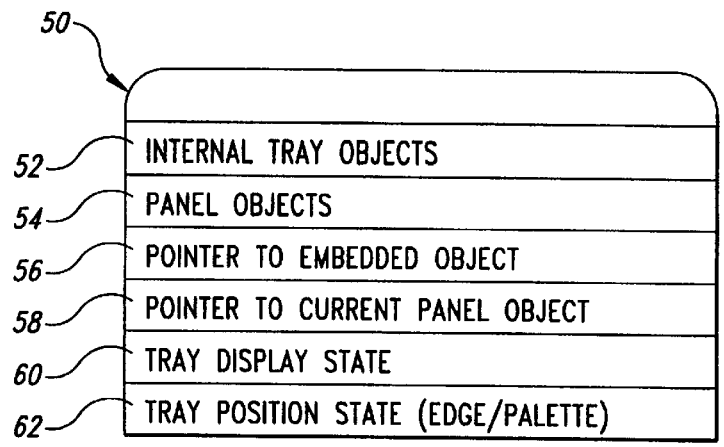
FIGS. 6a, 6b and 6c schematically depict the structure of the Tray Object.

Turning now to FIG. 6a, the Tray Object 50 comprises a number of distinct fields relating to the display behavior of the tray section 12 as well as the behavior of independent objects which have become associated with the tray section 12. The Tray Object 50 includes internal tray objects 52, panel objects 54, a pointer to an embedded object 56, a pointer to the current panel object 58, a tray display state variable 60, and a tray position variable 62.

Figure 6B:
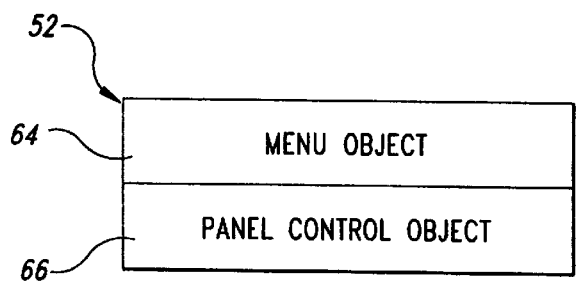

Turning briefly to FIG. 6b, the internal tray objects 52 include the Menu Object 64 which supports the display, selection by a user, and execution of system commands listed within a popup menu associated with the system icon 28 in the command area 22 of the tray. Also included in the Menu Object 64 are the dimensions and placement of the rectangle corresponding to the popup menu associated with the system icon. The Panel Control Object 66 supports the display and selection by a user of a list of panels associated with the tray section 12 from a popup menu associated with the panel button 34. Also included in the Panel Control Object 66 are the dimensions and placement of the rectangle corresponding to the popup menu associated with the panel button 34.

Figure 6C:
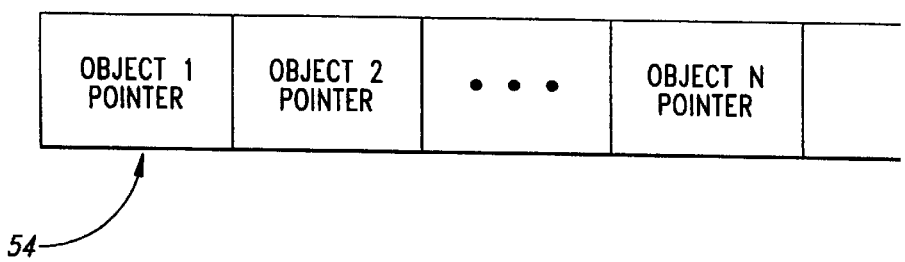

Turning now to FIG. 6c, each panel displayed in the panel area 24 of the tray section 12 is associated with a panel object. The individual panel objects are maintained by an array of pointers stored in the panel objects 54 data structure. If the computer system presently has N panels associated with the panel area 24, then the panel objects 54 comprise an array of N pointers. Returning to FIG. 6a, the Tray Object 50 includes the pointer to the current panel object 58 which points to the location in the panel objects 54 array corresponding to the panel currently visible in the tray section 12.

In an embodiment of the present invention, the tray section 12 supports only a single embedded object. The single embedded object is addressed by the pointer to embedded object 56. Other embodiments of the invention may include multiple embedded objects.

The display state (visible, collapsed, or hidden) as well as the position (palette or attached to an edge) of the tray section 12 have been previously discussed. The tray display state 60 and tray position state 62 variables maintain these two user modifiable characteristics of the tray section 12.

The act of causing an independent object to become associated with the Tray Object 50 is referred to herein as "docking". One manner in which a user invokes the docking process on an independent object is by guiding the mouse controlled pointer to a window displayed in the applications section 14 of the display screen and thereafter selecting a dock command on a menu associated with the window. Alternatively, the user docks an object by selecting the window using the mouse controlled pointer, dragging the window to the panel area 24 and dropping the window in the panel area 24. Of course other methods for a user to invoke the process of docking an independent object to the Tray Object 50 would be known to those skilled in the art in view of the above description of docking a computer resource.

Figure 7:
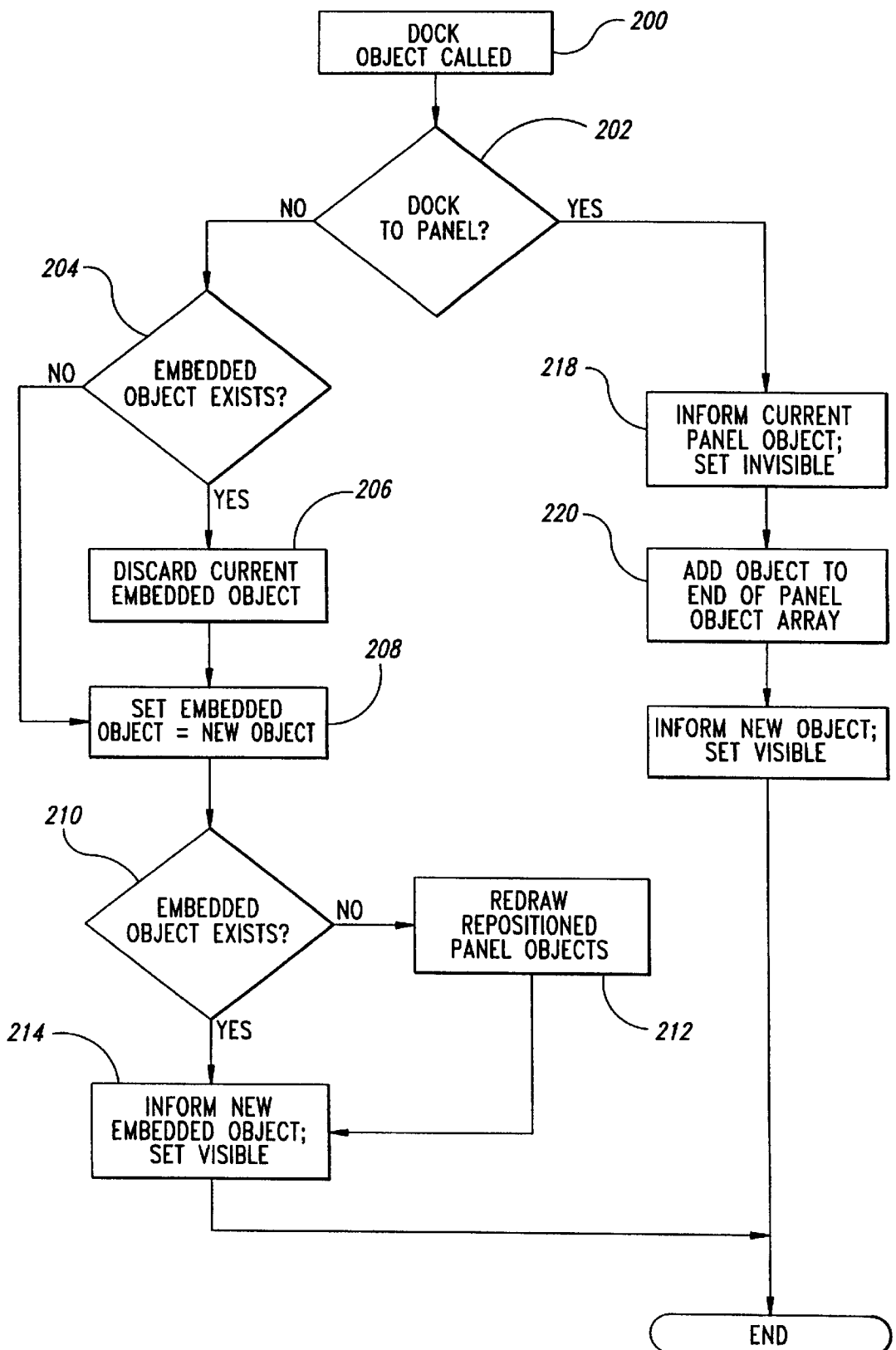
FIG. 7 is a flow diagram summarizing the steps for docking an object to the tray section.

The steps illustrated in FIG. 7 are executed by the computer system when a user attempts to dock an independent object to the tray section 12. In response to the above described user actions, the Dock Object function is called at step 200. Initially, the computer system requires the application responsible for the object to be docked to pass a pointer to the object to be docked. Control then passes to step 202 wherein the computer system determines whether the user is attempting to dock the independent object to the panel area 24.

If, at step 202, the computer system determines that the independent object is to be embedded, then control passes to step 204 wherein the computer system determines whether an embedded object currently exists in the Tray Object 50. If an embedded object currently exists in the Tray Object 50, then control passes to step 206 wherein the computer system discards the currently embedded object according to known Object Linking and Embedding (OLE) procedures. Control then passes to step 208 wherein the computer system stores the pointer to the new embedded object in the pointer to embedded object 56 field of the Tray Object 50 and performs known OLE procedures for embedding the independent object.

If at step 204, the computer system determines that an embedded object did not previously exist in the Tray Object 50, then control passes to step 208. After completion of step 208, control passes to step 210 wherein the computer system determines whether an embedded object previously existed prior to the embedding of the independent object. If no embedded object previously existed in the Tray Object 50, then control passes to step 212 wherein the computer system adjusts the allocation of the space in the tray section 12 to accommodate the portion of the tray section 12 allocated for displaying an embedded object and redraws the panel area to reflect the new space allocation. Thereafter, control passes to step 214 wherein the computer system informs the independent object that it is now embedded in the Tray Object 50 and sets the display state for the embedded object to "visible" to enable display of the embedded object within the tray section 12.

If, however, at step 210 the computer system determines that an embedded object did previously exist in the Tray Object 50, then control passes to step 214 described above. Control then passes to the end step 216.

If, however, at step 202 the computer system determines that the independent object is to be added in the panel area 24, then control passes to step 218 wherein the computer system in a known manner informs the currently displayed panel in a known manner that it is being displaced by a new panel. The display state of the current panel is set to "invisible". Control then passes to step 220 wherein the computer system stores the pointer to the independent object in the array of panel objects 54 field of the Tray Object 50 and performs known OLE procedures for adding the independent object to the Tray Object 50. In addition the pointer to current panel object 58 is modified to point to the location of the new panel object in the array of panel objects 54. Control then passes to step 222 wherein the computer system informs the independent object that it is now associated with the Tray Object 50 and sets the display state for the object to "visible" to enable display of the object within the tray section 12.

From the above description of the docking process, it is apparent that when an object is docked, its relationship to the objects empaneled or embedded in the tray section 12 is characterized in one of two ways.

In a first instance, the docking of the object requires the computer system to create a new panel. A previously displayed panel disappears from view and is replaced by a new panel when the object is docked. An example of such an application is a program manager application described below.

In a second instance, the docked object becomes a part of a permanently displayed extended command area 23 of the tray section 12. This is referred to as an "embedded" computer resource. Advancing the panels in the panel area 24 of the tray section 12 does not cause an embedded computer resource to disappear from the display screen. As a consequence, the portion of the tray section 12 allocated to the panel area 24 is decreased by the amount of display space consumed by the embedded computer resource. An example of such an application is a digital clock display 44 illustratively depicted in FIG. 2. The advanceable panel area 24 is reduced to the area between the command area 22 and the embedded digital clock display 44.

When an application becomes docked to the tray section 12, the independent object defines a set of resources of the object that are easily accessed by the user by means of the tray section 12 and the Tray Object 50 which provides the framework for docked tray objects. When a user docks an application, the application may instruct the CPU 2 to continue executing the docked application displayed in the tray section 12. Because an application is capable of exposing features directly accessible by the user through the application, the docked application can expose key features of its user interface thus enabling the user to control the operation of the docked window without crowding the applications section 14 of the display screen or selecting and de-selecting the window.

An example of the ability of docked resources to expose features which are accessible to the user by means of the graphic user interface is the "Explorer Object". The Explorer Object (shown in the panel section 24 of FIG. 2), in addition to providing a wastebasket and printer facility, also provides a container for dragging and dropping opened folders and documents for temporary storage and easy retrieval. This pseudo-docking of computer resources within a docked object is intended to illustrate the versatility of the Tray Object 50.

The docking of a program manager window is another example of the advantages provided by the tray section 12 of the present invention. In its undocked state, a program manager presents a list of active application programs to the user and means for controlling the execution of the applications programs. The program manager enables the user to cause any of the listed applications to be surfaced (i.e., displayed in the applications section 14). In the docked state, the program manager interface, when displayed in the panel area 24, comprises a set of mouse-controlled pointer-sensitive buttons corresponding to the list of running application programs. The user selects the running application programs for display in the applications section 14 by guiding the pointer to a button representing the desired application displayed in the tray section 12 occupied by the docked program manager and thereafter selecting the application by clicking the mouse.

In an embodiment of the present invention, each application capable of docking within the tray section 12 includes a set of descriptors which inform the computer system of the application program's behavior in regard to the tray section 12. The application program informs the system whether to add the application's docked window image to the currently displayed panel area 24. The application also specifies a desired width for the docked window image. The application designates whether or not the docked application is an embedded form and therefore permanently displayed in the command area 22 of the tray section 12 when docked. Embedded docked applications are discussed in greater detail below.

In order to prevent accidental docking of an application, an application includes a drag/drop enable field. When set to false, a user cannot dock the application by means of the drag/drop process.

An application program also designates a minimum size requirement. Before docking, the CPU 2 determines whether the available space in the present panel exceeds the minimum size requirement for the application. If the CPU 2 determines there is insufficient space available in the presently displayed panel, then the CPU 2 will prevent docking of the application within the current panel area 24.

In a multi-tasking environment, it is important for the computer system to avoid excessive processing of an application which is of lesser importance to the user once the application is docked. As a consequence, each application contains a priority setting designating a relative decrease in execution activity when the application is docked. For example, if an application is allocated 40 percent of the CPU time and the priority setting designates a slow down to 25 percent of its non-docked CPU time, then only 10 percent of the CPU time will be allocated to the docked application. As a further refinement, the application designates distinct priority settings for a visible docked application and a non-visible docked application.

The act of causing an object associated with the Tray Object 50 to become disassociated with the Tray Object 50 is referred to herein as "undocking". In order to "undock" an object residing in the tray section 12, the user selects the computer resource by guiding a mouse-controlled pointer to the display space of the tray section 12 corresponding to the object and thereafter selecting an undock command. Alternatively, the user may undock an object from the panel area 24 by dragging the panel or embedded object out of the tray section 12 and then dropping the panel or embedded object. Of course other methods for undocking a computer resource in the panel area 24 would be known to those skilled in the art in view of the above description of the steps for undocking a computer resource.

Figure 8:
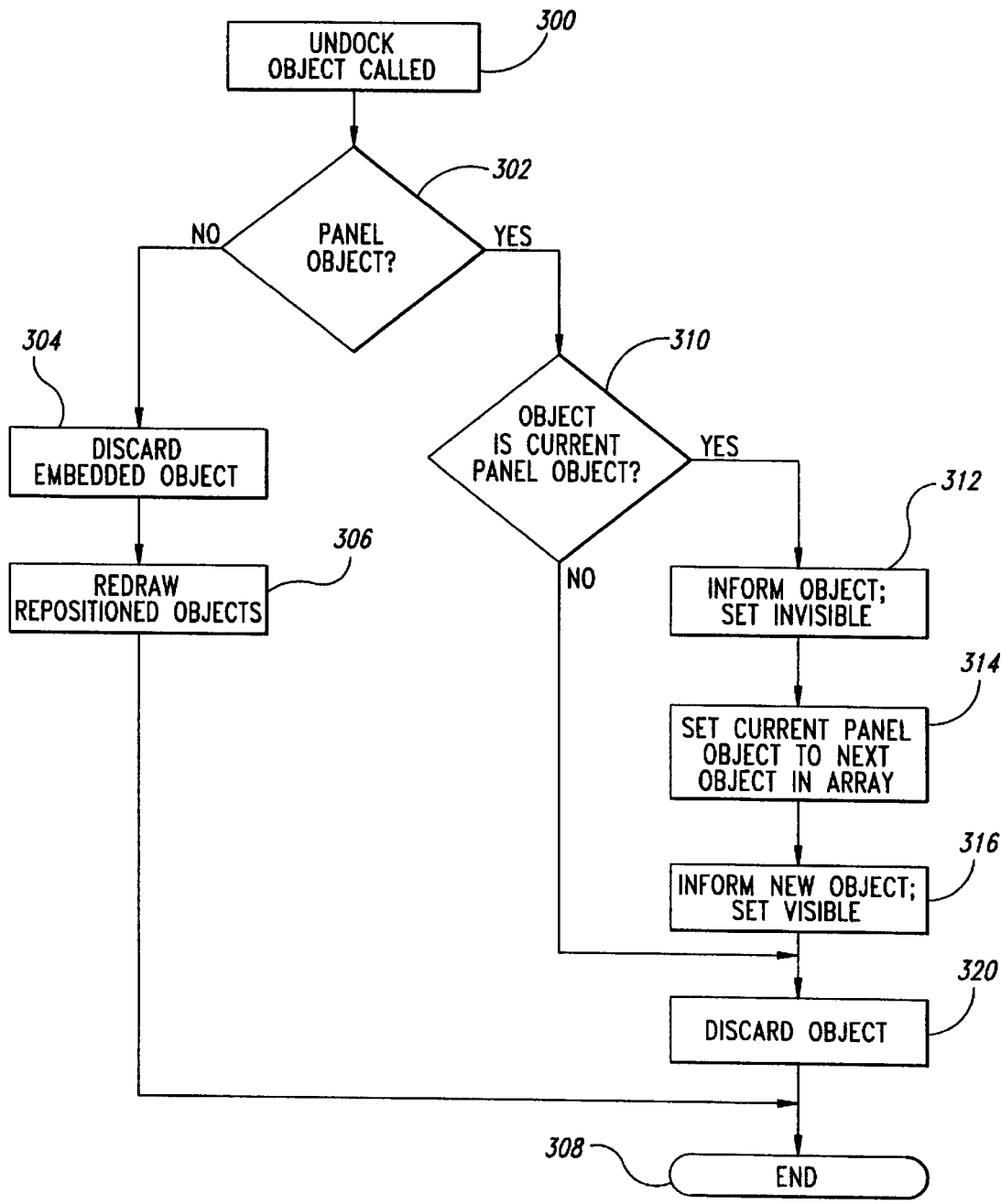
FIG. 8 is a flow diagram summarizing the steps for undocking an object from the tray section.

The steps illustrated in FIG. 8 are executed by the computer system when a user attempts to undock an empaneled or embedded object from the tray section 12. In response to the above described user actions, the Undock Object is called at step 300. Control then passes to step 302 wherein the computer system determines whether the user is attempting to undock the independent object from the panel area 24. If the computer system determines at step 302 that an embedded object is to be undocked, then control passes to step 304 wherein the computer system discards the embedded object according to known OLE procedures. Control then passes to step 306 wherein the computer system adjusts the allocation of the space in the tray section 12 to accommodate the portion of the tray section 12 re-allocated for displaying the panel area 24 and redraws the panel area to reflect the new space allocation. Control then passes to the end step 308.

If at step 302, the computer system determines that a panel object is to be undocked, then control passes to step 310 wherein the computer determines whether the panel to be removed is the currently displayed panel. If at step 310 the panel to be removed is not the currently displayed panel, then control passes to step 320 wherein the computer system discards the undocked object according to known OLE procedures.

If, however, at step 310 the computer system determines that the panel object to be removed is the currently displayed panel, then control passes to step 312 wherein the computer system informs the panel object that it is being undocked in accordance with known OLE procedures, and the display state of the panel object is set to invisible. Control then passes to step 314 wherein the computer system sets the pointer to current panel object to the next panel object in the array of panel objects 54. Control then passes to step 316 wherein the computer system informs the next panel object in the array of panel objects 54 that it is now the currently displayed panel object and sets the display state of the new current panel object to visible. Control then passes step 320 wherein the computer system discards the undocked panel object according to known OLE procedures. Control then passes to the end step 308.

A number of other applications programs are envisioned. Applications well suited to docking on the tray section 12 include an accessibility package monitor for the visually impaired user, an alarm clock, an application launcher (in contrast to a program manager) which not only surfaces windows but also starts programs. Other examples of possible applications amenable to the tray environment include: a compact disc (CD) or television control panel, a clipboard, a control panel containing a set of most used applications, a drive/volume panel containing a set of memory storage locations, file search facilities, project time clocks, a queue manager, a network manager, a stock ticker tape, a portable personal computer control panel for controlling the energy management routines of the portable computer. Another example for an application suitable for the tray section 12 is a file courier. The file courier would comprise a set of drop fields for files corresponding to such objects as a file compressor, a wastebasket, and an encryption utility. This list of possible applications suitable for the tray environment is certainly not complete. The possibilities for other applications are limitless.

The preferred embodiment of a modifiable, persistent system interface has been described. It would of course be known to one of ordinary skill in the area of user interfaces for computers and operating systems in general to make certain modifications to the afore-described system which would not depart from the scope and spirit of the invention described in the claims appended hereinafter. Such changes might entail modifying the actual computer resources accessed by means of the persistently accessible, user modifiable interface described above. It would also be known to modify the above disclosed system so that it is incorporated within a local area network, or a group of computer work stations sharing a mainframe operating system.

What is claimed is:

1. A graphical user interface for a computer system, the graphical user interface providing a user continuous convenient access to computer resources associated with a plurality of active applications, the graphical user interface comprising:

a sectioned display space, including: an applications section occupying a substantial majority of the display space and having associated therewith an active application having a window, and a tray section occupying a substantial minority of the display space and having associated therewith an extensible set of active applications;

a tray container for facilitating direct user access via the graphical user interface to computer resources associated with the extensible set of active applications, the tray container including:

docking means responsive to a user initiated command for adding the active application to the extensible set of active applications associated with the tray section, and a docked applications list automatically updated to specify the extensible set of active applications, wherein the docked applications list includes a panel list designating an extensible set of empaneled applications associated with a panel region of the tray section; and tray display means for facilitating display within the tray section, the tray display means displaying a panel button for enabling a user to select for display in the panel region one of a set of panels, each panel of the set of panels comprising a graphic representations associated with one of the extensible set of empaneled applications.

2. The graphical user interface of claim 1 wherein the tray display means includes means for specifying the portion of the sectioned display space occupied by the tray section.

3. The graphical user interface of claim 2 wherein the tray display means further comprises means for limiting maximization of a window associated with the applications section to an inside border of the tray section when a tray position register defines the tray section as attached to an edge of the display screen.

4. The graphical user interface of claim 1 wherein the docked applications list includes an embedded object list designating at least one embedded application associated with an embedded object region of the tray section; and wherein the tray display means includes means for facilitating display within the embedded object region graphic representations associated with the at least one embedded application.

5. The graphical user interface of claim 1 wherein the docking means includes a selection device for enabling the user to designate the active application.

6. The graphical user interface of claim 5 wherein the selection device comprises a mouse.

7. The graphical user interface of claim 5 wherein the selection device comprises a keyboard.

8. The graphical user interface of claim 1 wherein the tray container includes a permanently embedded computer resource, and wherein the tray display means includes means for facilitating display of a command region within the tray section, the command region displaying a graphical representation associated with the permanently embedded computer resource.

9. The graphical user interface of claim 1 further comprising undocking means for removing, in response to a second user initiated command, one of the active applications from the extensible set of active applications associated with the tray section.

10. The graphical user interface of claim 1 wherein the tray display means further comprises means for preempting the applications section from the portion of the sectioned display space occupied by the tray section.

11. The graphical user interface of claim 1, wherein the active application has a docked and a undocked mode of operation, and the window of the active application has a docked and an undocked view;

whereby the active application is in the docked mode of operation and its window presents the docked view when the active application is docked to the tray section, and the activated application is in the undocked mode of operation and its window presents the undocked view when the active application is not docked to the tray section.

12. A graphical user interface for a computer system for providing a user with continuous access to computer resources that are associated with active applications, said graphical user interface comprising:

a sectioned display space, including:
an application section occupying a substantial majority of the display space and having associated therewith a first active application,
a pointer for indicating on the sectioned display space a position in response to a selection device for enabling the user to designate the position of the pointer, and
a tray section occupying a substantial minority of the display space and having associated therewith an extensible set of active applications; and an access component for facilitating direct user access via the graphical user interfaces to the computer resources associated with the active applications, said access component including:
a tray display state controller facilitating display of the tray section in a variety of modes, and wherein the variety of modes includes a normal display mode wherein graphic representations provided by the extensible set of active applications are displayed within the tray section, and a collapsed mode for causing the tray section to occupy only a small fraction of the area occupied by the tray section in the normal display mode, wherein the tray display controller automatically switches the tray section from the collapsed mode to the normal display mode in response to the pointer being positioned near the tray section.

13. The graphical user interface of claim 12 wherein the tray section, while the tray display means is in the collapsed mode, is occupied by a thin bar extending along an edge of the sectioned display space, and wherein tray display state controller replaces the collapsed mode by the normal display mode in response to a user supplied command.

14. The graphical user interface of claim 12 wherein the variety of modes further includes a hidden mode wherein the tray section does not occupy any space within the sectioned display space.

15. A graphical user interace for a computer system for providing a user with continuous access to computer resources that are associated with activated applications, said graphical user interface comprising:

a sectioned display space, including:
an apparatus section occupying a substantial majority of the display space and having associated therewith a first activated application, and
a tray section occupying a substantial minority of the display space and having associated therewith an extensible set of activated applications; and an access component for facilitating direct user access via the graphical user interfaces to the computer resources associated with the activated applications;

wherein the first activated application defines a set of operational characteristics for the first activated application after becoming associated with the tray section and wherein a one of the operational characteristics includes an execution rate for at least one of the activated applications associated with the tray section.

16. The graphical user interface of claim 15 wherein a one of the operational characteristics includes a set of computer resources associated with the first activated application and directly accessible by the user via the graphical user interface and graphic representations displayed within the tray section.

17. The graphical user interface of claim 16 wherein the first activated application comprises a container object for receiving via a drag-and-drop operation a second object, displaying within the tray section a graphical representation corresponding to the second object, and enabling direct retrieval of the second object from the tray section.

18. The graphical user interface of claim 17 wherein the second object is a document.

19. The graphical user interface of claim 17 wherein the second object is a folder.

20. The graphical user interface of claim 16 wherein the first activated application comprises a program manager for displaying within the tray section a set of graphical representations corresponding to a set of currently running applications programs and displaying in the applications section a one of the set of currently running applications in accordance with a user initiated selection of a one of the set of graphical representations.

21. A computer system having a graphical user interface providing a user continuous convenient access to computer resources associated with a plurality of active applications, the computer system comprising:

an electronic data storage;

a central processing unit (CPU) communicatively coupled to the electronic data storage;

an electronic display coupled to the CPU and having a sectioned display space, including: an applications section occupying a substantial majority of the display space and having associated therewith an active application having a window, and a tray section occupying a substantial minority of the display space and having associated therewith an extensible set of active applications;

a tray container for facilitating direct user access via the graphical user interface to computer resources associated with the extensible set of active applications, the tray container including: docking means for adding, in accordance with a user initiated command, the active application to the extensible set of active applications associated with the tray section; and tray display means for facilitating display within the tray section of the window of each application of the extensible set of active applications, the tray display means includes means for facilitating display within an embedded object region graphic representations associated with the at least one embedded application; and a docked applications list automatically updated to specify the extensible set of active applications, the docked applications list includes an embedded object list designating at least one embedded application associated with the embedded object region of the tray section.

22. In a computer system having a graphical user interface, a method for providing a user continuous convenient access to computer resources associated with a plurality of active applications, the method comprising the steps of:

defining a sectioned display space, the sectioned display space including: an applications section occupying a substantial majority of the display space and having associated therewith an active application having a window, a tray section occupying a substantial minority of the display space and having associated therewith an extensible set of active applications, and a command region;

providing a tray container for facilitating direct user access via the graphical user interface to computer resources associated with the extensible set of active applications;

specifying a permanently embedded object;

displaying within the command region graphic representations associated with the permanently embedded object;

adding the active application to the extensible set of active applications associated with the tray section in accordance with a user initiated command; and displaying within the tray section a graphic representation of the active application after adding the active application to the extensible set of active applications.

23. The method of claim 22 further comprising the step of verifying that the active application is capable of being added to the extensible set of active applications associated with the tray section.

24. The method of claim 22 further comprising the step of limiting maximization of a window displayed in the applications section to a portion of the sectioned display space not occupied by the tray section.

25. The method of claim 24 further comprising the steps of receiving a user initiated command to minimize the area of the tray section, and in response thereto, defining an area for the tray section substantially smaller than a default size for the tray section.

26. The method of claim 25 further comprising the steps of:

displaying a thin bar within the minimized tray section;

re-defining an area for the tray section substantially larger than the area for the minimized tray section in response to a user initiated command; and replacing the thin bar by a set of graphical representations corresponding to the computer resources associated with the extensible set of activated applications.

27. The method of claim 24 further comprising the steps of:

receiving a user initiated command to remove the tray section from the sectioned display space, and in response thereto, defining an area occupied by the applications section as being equal to the sectioned display space and removing all graphic representations associated with the tray container from the graphical user interface.

28. The method of claim 22 further comprising the steps of receiving a user initiated command and in response thereto removing one of the activated applications from the extensible set of activated applications.

29. The method of claim 22 wherein the adding step comprises the step of receiving a set of operational characteristics provided by the activated application.

30. The method of claim 29 wherein the step of receiving a set of operational characteristics comprises receiving a set of computer resources, based on the set of operational characteristics received, associated with the activated application directly accessible by a user via the graphical user interface and graphic representations displayed within the tray section.

31. The method of claim 30 wherein the activated application comprises a container object for temporary storage and direct access via the graphical user interface, further comprising the step of:

receiving by the container object via a drag-and-drop operation a second object, displaying within the tray section a graphical representation corresponding to the second object, and enabling direct retrieval of the second object from the tray section.

32. The method of claim 30, wherein the activated application comprises a program manager providing direct access via the graphical user interface to a multi-program control, further comprising the steps:

displaying within the tray section, in accordance with commands provided by the program manager, the window of each application of the currently running applications programs; and selecting for display in the applications section, in response to a user initiated selection, one of the windows of the currently running applications.

33. The method of claim 22 further comprising the steps of:

defining the perimeter of the applications section as being equal to a portion of the sectioned display space not allocated to the tray section; and positioning the tray section along an edge of the sectioned display space.

34. The method of claim 33 wherein the defining the perimeter of the applications section step further includes the steps:

receiving a command to redefine the portion of the sectioned display space allocated to the tray section;

redefining a portion of the sectioned display space allocated to the tray section in accordance with the command; and redefining the perimeter of the applications section as being equal to a portion of the sectioned display space not occupied by the redefined tray section.

35. In a computer system, a computer-readable storage medium holding instructions for providing a graphical interface wherein the graphical user interface provides a user with access to computer resources associated with a plurality of activated applications, the graphical user interface comprising:

a sectioned display space, including: an applications section occupying a substantial majority of the display space and having associated therewith an activated application, and a tray section occupying a substantial minority of the display space and having associated therewith an extensible set of activated applications;

a tray container for facilitating direct user access via the graphical user interface to computer resources associated with the extensible set of activated applications, the tray container including: a docked applications list specifying the extensible set of activated applications, the docked applications list including an embedded object list designating at least one embedded application associated with an embedded object region of the tray section, and-docking means for adding, in accordance with a user initiated command, the activated application to the extensible set of activated applications associated with the tray section; and tray display means for facilitating display within the tray section of a set of graphical representations corresponding to the computer resources associated with the extensible set of activated applications, the tray display means including: means for preempting the applications section from the portion of the sectioned display space occupied by the tray section, and means for facilitating display within the embedded object region graphic representations associated with the at least one embedded application.

36. In a computer system, a computer-readable storage medium holding instructions for providing a graphical interface that provides a user with continuous access to computer resources that are associated with activated applications, the graphical user interface comprising:

a sectioned display space including: an application section occupying a substantial majority of the display space and having associated therewith an activated application, and a tray section occupying a substantial minority of the display space and having associated therewith an extensible set of activated applications; and an access component for facilitating direct user access via the graphical user interface to the computer resources associated with the activated applications, the access component including: a tray display state controller facilitating display of the tray section in a variety of modes, and wherein the variety of modes includes a normal display mode wherein graphic representations provided by the extensible set of activated applications are displayed within the tray section, and a collapsed mode for causing the tray section to occupy only a small fraction of the area occupied by the tray section in the normal display mode, wherein the tray display controller automatically switches the tray section from the collapsed mode to the normal display mode in response to a display indicator being positioned near the tray section.

37. The computer-readable storage medium of claim 36 wherein the tray section, while the tray display means is in the collapsed mode, is occupied by a thin bar extending along an edge of the sectioned display space, and wherein the tray display state controller replaces the collapsed mode by the normal display mode in response to a user supplied command.

38. The computer-readable storage medium of claim 36 wherein the variety of modes further includes a hidden mode wherein the tray section does not occupy any space within the sectioned display space.

39. In a computer system, a computer-readable storage medium holding instructions for generating a graphical user interface that provides a user with continuous access to computer resources that are associated with activated applications, the graphical user interface comprising:

a sectioned display space, including: an application section occupying a substantial majority of the display space and having associated therewith an activated application, and a tray section occupying a substantial minority of the display space and having associated therewith an extensible set of activated applications; and an access component for facilitating direct user access via the graphical user interfaces to the computer resources associated with the activated applications;

wherein the activated application defines a set of operational characteristics for the activated application after becoming associated with the tray section and wherein one of the operational characteristics includes an execution rate for the activated application associated with the tray section.

40. The computer-readable storage medium of claim 39 wherein one of the operational characteristics includes a set of computer resources associated with the activated application that are directly accessible by the user via the graphical user interface and graphic representations displayed with the tray section.

41. The computer-readable storage medium of claim 39 wherein the activated application comprises a container object for receiving via a drag-and-drop operation a second object, displaying within the tray section a graphical representation corresponding to the second object, and enabling direct retrieval of the second object from the tray section.

42. The computer-readable storage medium of claim 41 wherein the second object is a document.

43. The computer-readable storage medium of claim 41 wherein the second object is a folder.

44. A graphical user interface for a computer system, the graphical user interface providing a user continuous access to computer resources associated with a plurality of activate applications, the graphical user interface comprising: a sectioned display space, including: an applications section of the display space having associated therewith an activated application, and a tray section of the display space having associated therewith an extensible set of activated applications; and a tray container for facilitating direct user access via the graphical user interface to computer resources associated with the extensible set of activated applications, the tray container including: docking means for adding, in accordance with a user initiated command, the activated application to the extensible set of applications associated with the tray section, wherein the activated application defines a set of operational characteristics for the activated application after becoming associated with the tray section, where one of the operational characteristics is an execution rate of the activated application.

45. The graphical user interface of claim 44 wherein the tray container includes tray display means for facilitating the display within the tray section of a set of graphical representations corresponding to the computer resources associated with the extensible set of activated applications.

46. The graphical user interface of claim 44 wherein the docking means includes means for, notifying the activated application when it has been added to the extensible set of activated applications associated with the tray section.

47. The graphical user interface of claim 44 wherein the activated application has a docked and a undocked mode of operation.

48. The graphical user interface of claim 44 wherein the activated application has a display mode for when docked and a second display mode when undocked.

49. In a computer system having a graphical user interface, a method for providing a user continuous access to computer resources associated with a plurality of active applications, the method comprising the steps of:

defining a sectioned display space, including: an applications section occupying a first portion of the display space and having associated therewith an active application having a window, and a tray section occupying a second portion of the display space and having associated therewith an extensible set of active applications, wherein the applications section is preempted from the portion of the sectioned display space occupied by the tray section;

providing a tray container for facilitating direct user access via the graphical user interface to computer resources associated with the extensible set of active applications, including specifying the extensible set of activated applications in a list data structure and a panel list designating an extensible set of empaneled applications associated with the panel region;

adding the active application to the extensible set of active applications associated with the tray section in accordance with z user initiated command;

positioning the tray section along an edge of the sectioned display space;

defining the perimeter of the applications section as being equal to a portion of the sectioned display space not allocated to the tray section, and defining a panel region within the tray section;

displaying within the tray section a set of graphical representations corresponding to the computer resources associated with the extensible set of activated applications;

displaying within the panel region, in accordance with a user initiated command, ones of a set of panels, each panel comprising graphic representations associated with one of the extensible set of empaneled applications; and displaying by the graphical user interface a panel control button for enabling a user to select, via the graphical user interface, one of the set of panels for display in the panel region.

50. The method of claim 49 wherein the defining the sectioned display space step includes further defining an embedded object region within the tray section, and wherein the step of specifying the extensible set of activated applications includes specifying an embedded object list designating at least one embedded application associated with the embedded object region of the tray section, and wherein the method includes displaying within the embedded object region graphic representations associated with the at least one embedded application.

* * * * *

UNITED STATES PATENT AND TRADEMARK OFFICE
CERTIFICATE OF CORRECTION

PATENT NO. : 5,825,357
DATED : October 20, 1998
INVENTOR(S) : MALAMUD et al.

It is certified that error appears in the above-identified patent and that said Letters Patent is hereby corrected as shown below:

On the title page under item [56], page 2, under Other Publications

On page 2, line 11: "past" should read --Past--.
   On page 2, line 16: "Eass" should read --Eases--.
   On page 2, line 21: "Communting" should read --Computing--.

In Column 14, line 22: "interace" should read --interface--.

Signed and Sealed this

Fourteenth Day of September, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,825,357
DATED : October 20, 1998
INVENTOR(S) : Malamud et al.

It is certified that an error appears in the above-identified patent and that said Letters Patent is hereby corrected as shown below:

ON THE TITLE PAGE:

item [56] References Cited, Other Publications, the following cited reference should be added:

IBM Corporation, "ICON Safe Zone", IBM Technical Disclosure Bulletin 35(6):34-35, November 1992

Signed and Sealed this

Fourth Day of April, 2000

*Attest:*

Q. TODD DICKINSON

*Attesting Officer*   *Director of Patents and Trademarks*